Patented Apr. 7, 1936

2,036,469

UNITED STATES PATENT OFFICE 2,036,469

PETROLEUM SULPHONIC ACIDS AND SULPHONATES AND PROCESSES OF PREPARING THE SAME

Edward Field, Berkeley, Calif., assignor to Standard Oil Company of California, San Francisco, Calif., a corporation of Delaware No Drawing. Application March 26, 1934,
Serial No. 717,431

16 Claims. (Cl. 260—159)

This invention relates to water soluble petroleum sulphonic acids and alkali metal sulphonates thereof, and to processes of preparing the same. In particular, it relates to the preparation of certain petroleum sulphonic acids, whose calcium and magnesium salts are freely water soluble, and whose alkali salts lather freely in hard or mineral waters, sea water and strong brine, and hence, in addition to the emulsifying, wetting-out and spreading properties characteristic of compositions of this class, provides superior detergents and cleansing agents for use with hard waters, sea water or brine.

As is well known, sulphonic acids of widely varying properties are produced by treating various mineral or petroleum oils with sulphuric acid of sulphonating strength, and, when such sulphonic acids are neutralized with an alkali, metallic sulphonates of widely differing characteristics are formed, suitable for diverse application as detergents, cleansing agents, wetting-out agents, emulsifiers, spreaders, insecticide carriers and the like.

I have now found that by suitable control of the amount and strength of the sulphuric acid used to sulphonate, and by suitable choice of the hydrocarbons to be sulphonated, I am able, with certain novel purification steps, to provide novel and superior compositions of this type, capable of wider application than has thus far been possible with the compositions of the art.

It is a purpose of my invention to disclose and provide petroleum sulphonic acids and alkali metal sulphonates of exceptional purity, which alkali metal salts are useful, in addition to acting as emulsifiers, wetting-out agents, and spreaders, as detergent soaps and cleansing agents for the skin and for fabrics, and which leave no appreciable residual color or odor upon such use. It is a further purpose of my invention to disclose and provide sulphonic acids whose calcium and magnesium salts are freely soluble in water, and whose sodium salts lather freely in hard or mineral waters, sea water, and even in strong brine, and which are, in consequence, excellent detergent agents for use in conjunction therewith. It is a further object of my invention to disclose and provide novel methods for producing sulphonic acids and alkali metal salts thereof which possess these desirable properties, and, in addition, are capable of the uses to which the ordinary compositions of this type are already generally put, viz., as emulsifiers, spreaders, wetting-out agents, and the like.

In the process of my invention, I first sulphonate mineral oil fractions of relatively low boiling point range and of relatively high aromatic and/or unsaturated hydrocarbon content, with a sulphuric acid of relatively low sulphonating strength. I then dilute the reaction products with water, and cause separation of the desired sulphonic acids, in a crude form, from residual mineral oil, on the one hand, and from dilute aqueous sulphuric acid, on the other hand. The separated crude sulphonic acids are then neutralized with a caustic alkali, and tarry and other objectionable oil-soluble impurities are removed by extraction of the aqueous alkaline sulphonate solution with benzol, xylol or an equivalent highly aromatic or unsaturated solvent. Finally, this purified aqueous solution of alkali metal sulphonates is poured into cold saturated brine, whereupon the solid alkali metal sulphonates are salted out; these precipitated sulphonates are collected by filtration, decantation or sedimentation and pressed free from adhering brine.

As noted, I employ hydrocarbons of relatively low boiling point range and of relatively high aromatic and/or unsaturated content. I prefer to employ hydrocarbons contained in liquid sulphur dioxide extracts of kerosene or illuminating oil distillates, as produced in the well known Edeleanu process of refining such kerosene distillates. These extracts, that is, the hydrocarbons dissolved by liquid sulphur dioxide in the Edeleanu refining process, are composed almost entirely of aromatic and/or unsaturated hydrocarbons, and have a boiling point range of, roughly, 350°–550° F. I have found, in particular, that the presence of materially higher boiling point hydrocarbons, for example those anywhere within the lubricating oil range of boiling points, yield little or no sulphonic acids possessing the characteristics of those of my invention, and that the presence of very large amounts of saturated or unsulphonatable hydrocarbons not only decreases remarkably the yield of the sulphonic acids of my invention, but has a material effect upon the character of the sulphonic acids themselves. I therefore use a liquid sulphur dioxide extract of a kerosene type distillate, and preferably do not use a kerosene distillate itself, a lubricating oil distillate, or even a sulphur dioxide extract of a lubricating oil distillate.

Furthermore, I use a sulphuric acid of relatively low sulphonating strength, preferably no higher than 100% $H_2SO_4$, for I have found that sulphuric acids of high sulphonating strength, e. g., those containing substantial amounts of free sulphur trioxide, form undesirable oil-soluble sulphonic tarry matter, which modifies deleteriously the lathering properties of the alkali salts, particularly when used with hard waters, sea water and the like.

As a specific example of the method of manufacture of my product, I proceed as follows:

A quantity of sulphuric acid, free from carbonaceous material, of between 95 and 100% $H_2SO_4$ strength, and at ordinary temperatures, is charged into an agitator, either lead or glass lined, and provided with a draw-off valve at the bottom.

I agitate this acid mechanically or with a current of air, and while agitating it, run into it a quantity of a liquid sulphur dioxide extract of a kerosene type distillate about twice in volume that of the acid; the temperature of the oil should be about that of the acid, and I run in the extract over a period, generally speaking, of two or three hours. As an alternative procedure, I may add all of the oil at once, and then agitate the entire mixture for a period of two or three hours. During this course of time the temperature of the mixture gradually increases, generally reaching 130° to 140° F.; I make no effort to control temperature, unless, as may happen in unusual cases, a temperature of 150° F. or over is reached. The volume of acid which I use (about one half volume acid per volume oil) is not sufficient entirely to sulphonate all sulphonatable hydrocarbons; I prefer not to sulphonate all sulphonatable hydrocarbons, as I have found that the most easily sulphonatable constituents provide the most superior sulphonic acids for my purpose. For example, in one case, I treated a liquid sulphur dioxide extract of a kerosene distillate with one half its volume of 98% sulphuric acid, admixture of acid and oil being carried out over a period of two and one half hours, continued the agitation for an extra half hour after admixture had been made, and after separating residual oil from the reaction mixture, found that it contained about 66% by volume of hydrocarbons which might have been sulphonated with stronger sulphuric acid at higher temperatures.

After agitating mechanically or with a current of air, I add cold fresh water to the reaction mixture in amount about equal to the volume of acid originally used. This water is thoroughly mixed with the reaction mixture, upon which the mass is allowed to stand. Three layers separate: residual oil, as top layer; crude sulphonic acids, as an intermediate layer; and spent aqueous sulphuric acid, as a lower layer. After standing for complete stratification, the lower layer of spent sulphuric acid is drawn off, from which usable sulphuric acid may be recovered if desired. The upper or residual oil layer may also be removed, if desired, and may be used as fuel or for the manufacture of paint thinners and the like; I may, however, allow this upper or residual oil layer to remain, for I have found that when the succeeding neutralizing step is carried out in the presence of this oil, it acts to dissolve a part of the oil-soluble material sought to be entirely removed in the purification steps discussed more fully hereinbelow. The intermediate or sulphonic acid layer is now neutralized with aqueous caustic soda solution, preferably of high Baumé gravity (e. g., 25–35° Bé.) in order to prevent too great a dilution of the reaction mixture, to a point where the resulting solution first appears red to phenol phthalein indicator; agitation during this neutralizing operation may be by a current of air or other suitable means. The neutralizing reaction is completed by raising the temperature of the mixture to about 200°–210° F., by introduction of steam or otherwise, after which the batch is allowed to settle and cool.

The aqueous solution of crude sodium sulphonates is now separated from the residual oil layer, if this has not already been done, and is diluted with water, if desired, to a specific gravity of about 1.10 to 1.12 at 60°/60°. To remove undesirable oil-soluble sulphonic tarry matter, the aqueous solution is agitated with about half its volume of a solvent such as benzol, toluol, xylol, or an equivalent highly aromatic or unsaturated solvent; I have successfully used as such a solvent a rerun sulphur dioxide extract of kerosene, but I have found that petroleum ether, refined gasoline, refined kerosene and solvents of this character possess insufficient dissolving power completely to remove the tars and other deleterious impurities satisfactorily removed by the benzol, toluol, etc., particularly noted above as preferable.

This process of solvent extraction of the aqueous sodium sulphonates is repeated until the solvent is not appreciably darkened in color. The used solvent may, of course, be purified for reuse, by distillation or otherwise, if desired. In order to expedite the extraction of the said tarry matter, and to facilitate the breaking of such emulsions as may form during the extraction of the aqueous sodium sulphonates with the solvent, I raise the temperature of the mixture somewhat above atmospheric.

The purified aqueous solution of sodium sulphonates is now concentrated, if necessary, water being removed by any convenient means, such as by evaporation with a closed steam coil until the total solids content of the aqueous solution is 40 to 50 grams per 100 cc., as determined by evaporation of a small sample in a weighed dish at 105° C. Although the concentrated aqueous solutions of sodium sulphonates thus provided are the equivalents, for most purposes, of the solid products prepared in one modification of my process, solid products are in some instances more efficiently and advantageously handled in the industry, and I prepare such purified solid products from the above described concentrated aqueous solutions thereof as follows:

The concentrated, purified sulphonates solution described above, at ordinary temperatures, is poured into about ten times its volume of cold saturated salt brine of 24 to 25° Bé., at a temperature preferably no higher than about 55° F., the mass being agitated the while, either with air or by mechanical means. Solid sodium sulphonates are salted out from solution, and are collected by decantation or filtration through a suitable medium such as duck-cloth, and finally pressed on an absorbent medium to remove adhering brine. Last traces of brine may be removed if desired by dissolving the solid product in absolute methyl alcohol, separating any insoluble brine, and then recovering the methyl alcohol, thus leaving the product in a pure dry state, in which condition it may be packed into containers of suitable kind for distribution. In this salting-out process, cold saturated brine (24–25° Bé.), and temperatures not over 55° F. are advantageously used weaker brine, e. g., 20° Bé. brine, completely dissolves the product, and temperatures higher than about 55° F. leave the salted-out product in a difficultly separable form.

In order to acquaint those skilled in the art with the properties of my novel composition, I enumerate herewith such properties as serve not only to distinguish it from prior compositions, but to indicate its wide applicability as a detergent, cleansing agent, wetting-out agent, emulsifier, spreader, insecticide carrier, and the like:

It is very light in color, has but little odor of itself, and leaves very little residual odor on articles washed; such odor as remains is not unpleasant, but if desired may be easily masked by addition of a small quantity of essential oil or the like;

It is friable and powders easily, and with the addition of a small amount of water may be put in paste form in collapsible tubes;

Fine abrasives and/or glycerine may be mixed with it to improve and modify its cleansing action;

It is very soluble in water, hard or soft, producing a good lather, since calcium and magnesium salts form water soluble sulphonates with it;

A good lather is produced with sea water and with brine as strong as 20° Bé.;

It removes fuel oil, crude oil, dirt and grease stains, as it is partially soluble in oil and reliance need not therefore be placed on the abrasives generally used in compositions ordinarily used for such purposes;

It is soluble in alcohol, both ethyl and methyl, glycerine, acetone, 20° brine, and is slightly soluble in kerosene and in carbon tetrachloride. It is almost entirely insoluble in benzol;

It is a good emulsifying agent, wetting-out agent, carrier and spreader for insecticidal compositions and the like;

For analytical purposes, it may be mentioned that my product consists largely of sulphonates soluble in methanol (in a specific instance, 79% methanol soluble); and contains but a small amount of material soluble in a mixture consisting of ⅔ volume benzol and ⅓ volume acetone (in a specific instance, 14% soluble in benzol-acetone mixture.)

Although I wish in no sense to be limited by a theory underlying the wide adaptability of my composition, I have ascribed a larger number of its peculiarly advantageous properties to the presence of large amounts of methanol-soluble material, and to the absence of considerable amounts of benzol-soluble and benzol-acetone-soluble material therein. In this connection I may note that sulphonic acids and sodium sulphonates thereof prepared by the sulphonation of hydrocarbons of lubricating oils range, or by the sulphonation of liquid sulphur dioxide extracts of hydrocarbons of the lubricating oil range, contain large amounts of benzol-soluble material (in many cases 40 or more percent thereof), contain considerable amounts of benzol-acetone-soluble material (in most cases 25 or more percent thereof), and but relatively small amounts of methanol-soluble material (in most cases less than 30-40% thereof). Such compositions provide detergents of limited applicability, for their calcium and magnesium salts are insoluble in water, they do not lather freely in hard or mineral water, or sea water, and not at all in strong brine or similar salt solutions, and therefore do not possess many of the most advantageous characteristics of the composition of my present invention.

While the particular alkali metal sulphonates, whether in concentrated aqueous solution, or in solid form, hereinabove described, and the processes of producing the same are well adapted to carrying out the objects of the present invention, it will be understood that various changes and modifications may be made without departing from the spirit of the invention, and the invention is of the scope of the appended claims.

I claim:

1. A process of preparing alkali metal petroleum sulphonates comprising, treating a petroleum oil of kerosene boiling point range and containing sulphonatable hydrocarbons with sulphuric acid of a sulphonating strength to produce sulphonic acids, removing crude sulphonic acids from the reaction mixture, neutralizing the sulphonic acids with an aqueous caustic alkali, extracting the aqueous alkali metal sulphonates with an organic solvent of the class consisting of benzol, toluol, xylol and sulphur dioxide extracts of petroleum distillates to remove tars and other benzol soluble impurities, and concentrating the aqueous solution to provide a composition containing upward of 40% solids.

2. A process of preparing alkali metal petroleum sulphonates comprising, treating a petroleum oil of kerosene boiling point range and containing sulphonatable hydrocarbons with sulphuric acid of a sulphonating strength to produce sulphonic acids, removing crude sulphonic acids from the reaction mixture, neutralizing the sulphonic acids with an aqueous caustic alkali, extracting the aqueous alkali metal sulphonates with a solvent of the class consisting of benzol, toluol, xylol and sulphur dioxide extracts of petroleum distillates to remove tar and other benzol soluble impurities, and concentrating the aqueous sulphonate solution so purified.

3. A process of preparing alkali metal sulphonates comprising, treating a liquid sulphur dioxide extract of a hydrocarbon oil of kerosene boiling point range with sulphuric acid of a sulphonating strength, in amount less than sufficient to sulphonate all sulphonatable constituents, to produce sulphonic acids, removing crude sulphonic acids from the reaction mixture, neutralizing the sulphonic acids with an aqueous caustic alkali, and extracting the aqueous alkali sulphonates with an organic solvent of the class consisting of benzol, toluol, xylol and sulphur dioxide extracts of petroleum distillates to remove tars and other benzol soluble impurities.

4. A process of preparing alkali metal petroleum sulphonates comprising, treating a liquid sulphur dioxide extract of a kerosene type petroleum distillate with sulphuric acid of a sulphonating strength, in amount less than sufficient to sulphonate all sulphonatable constituents, to produce sulphonic acids, removing crude sulphonic acids from the reaction mixture, neutralizing the sulphonic acids with an aqueous caustic alkali, extracting the aqueous alkali metal sulphonates with an organic solvent of the class consisting of benzol, toluol, xylol and sulphur dioxide extracts of petroleum distillates to remove tars and other benzol soluble impurities, and concentrating the aqueous sulphonate solution so purified.

5. A process of preparing alkali metal petroleum sulphonates comprising, treating highly unsaturated or aromatic hydrocarbons within the approximate boiling range 350° to 550° F. with sulphuric acid of a sulphonating strength to produce sulphonic acids, adding water to the reaction mixture to cause stratification thereof, removing the sulphonic acid layer from such diluted and stratified reaction mixture, neutralizing sulphonic acids with a caustic alkali, extracting the alkali metal sulphonates with an organic solvent of the class consisting of benzol, toluol, xylol and sulphur dioxide extracts of petroleum distillates to remove tar and other soluble impurities, concentrating the aqueous solution, and producing solid alkali sulphonates by pouring the aqueous alkali metal sulphonate solution into brine of greater than 20° Bé. concentration.

6. A process of preparing alkali metal petroleum sulphonates comprising, treating a liquid sulphur dioxide extract of a kerosene type petroleum distillate with 95–100% sulphuric acid to produce sulphonic acids, adding an amount of water about equal to that of the acid used, to cause stratification of the reaction mixture into three layers, removing the intermediate crude sulphonic acid layer, neutralizing the sulphonic acids with a caustic alkali, extracting the alkali sulphonates with an organic solvent of the class consisting of benzol, toluol, xylol and sulphur dioxide extracts of petroleum distillates to remove tars and other soluble impurities, concentrating the aqueous solution of alkali metal sulphonates, producing solid alkali metal sulphonates by pouring the aqueous sulphonate into brine of greater than 20° Bé. concentration, separating the solid sulphonates thus produced and drying them.

7. A process of preparing alkali metal sulphonates comprising, treating a liquid sulphur dioxide extract of a kerosene type petroleum distillate with 95 to 100% $H_2SO_4$ in amount about one half that of the said liquid sulphur dioxide extract to produce sulphonic acids, removing crude sulphonic acids from the reaction mixture, neutralizing the crude sulphonic acids with an aqueous caustic alkali, extracting the alkali metal sulphonates with a solvent of the class consisting of benzol, toluol, xylol and sulphur dioxide extracts of petroleum distillates to remove tars and other soluble impurities, and producing solid alkali metal sulphonates by salting them out with 24 to 25° Bé. brine.

8. A process of preparing alkali metal petroleum sulphonates comprising treating a liquid sulphur dioxide extract of a kerosene type petroleum distillate with 95 to 100% sulphuric acid in amount about one half that of the said sulphur dioxide extract to produce sulphonic acids, removing crude sulphonic acids from the reaction mixture, neutralizing the sulphonic acids with a caustic alkali, and extracting the alkali sulphonates with a solvent of the class consisting of benzol, toluol, xylol and sulphur dioxide extracts of petroleum distillates to remove tars and other benzol soluble impurities.

9. A process of preparing alkali metal petroleum sulphonates comprising, treating a liquid sulphur dioxide extract of a kerosene type petroleum distillate with 95 to 100% sulphuric acid in amount about one half that of the said sulphur dioxide extract to produce sulphonic acids, removing crude sulphonic acids from the reaction mixture, extracting the aqueous alkali metal sulfonates with a solvent of the class consisting of benzol, toluol, xylol and sulphur dioxide extracts of petroleum distillates, and concentrating the aqueous solution to provide a composition containing upward of 40% solids.

10. A process of preparing alkali metal petroleum sulphonates comprising, treating a liquid sulphur dioxide extract of a kerosene type petroleum distillate with 95 to 100% $H_2SO_4$ in amount about one half that of the said sulphur dioxide extract to produce sulphonic acids, adding water to the reaction mixture to cause stratification thereof into three layers, removing the lower layer only of the three produced layers, neutralizing the sulphonic acids with an aqueous caustic alkali in the presence of the residual oil comprising the upper of the three layers produced, extracting the alkali metal sulphonates with a solvent of the class consisting of benzol, toluol, xylol and sulphur dioxide extracts of petroleum distillates to remove tars and other soluble impurities, concentrating the aqueous alkali metal sulphonates, and producing solid alkali metal sulphonates by salting them out with 24–25° Bé. brine.

11. A process of preparing alkali metal petroleum sulphonates comprising, treating a liquid sulphur dioxide extract of a kerosene type petroleum distillate with 95 to 100% sulphuric acid in amount about one half that of the sulphur dioxide extract to produce sulphonic acids, adding an amount of water about equal to that of the acid used, to cause stratification of the reaction mixture into three layers, removing the intermediate crude sulphonic acids layer, neutralizing the crude sulphonic acids with an aqueous caustic alkali, extracting the crude aqueous alkali metal sulphonates with a solvent of the class consisting of benzol, toluol, xylol and sulphur dioxide extracts of petroleum distillates, to remove tars and other soluble impurities, producing solid alkali metal sulphonates by pouring the aqueous sulphonic solution into 24–25° Bé. brine at temperatures not appreciably above 55° F., separating the solid sulphonates thus salted out from the brine, and drying them.

12. A mixture of purified alkali metal sulphonates obtained by treating a liquid sulphur dioxide extract of a kerosene type distillate with sulphuric acid of a sulfonating strength, neutralizing the produced sulphuric acid with an aqueous alkali, extracting the aqueous alkali sulphonates with a solvent of the class consisting of benzol, toluol, xylol and sulphur dioxide extracts of petroleum distillates to remove substantially all material soluble in benzol, and concentrating the purified aqueous alkali metal sulphonates.

13. A mixture of purified solid alkali metal sulphonates obtained by treating a liquid sulphur dioxide extract of a kerosene type distillate with sulphuric acid of a sulphonating strength, neutralizing produced sulphonic acids with a caustic alkali, extracting the alkali metal sulphonates with a solvent of the class consisting of benzol, toluol, xylol and sulphur dioxide extracts of petroleum distillates to remove benzol-soluble impurities, and salting out solid alkali metal sulphonates with 24–25° Bé. brine.

14. A mixture of petroleum sulphonic acids whose calcium and magnesium salts are freely water-soluble and whose alkali metal salts are soluble in 20° Baumé brine, insoluble in 24–25° Baumé brine, substantially free from benzol-soluble materials, soluble in methanol, ethanol, glycerine and acetone, and slightly soluble in kerosene and carbon tetrachloride.

15. A mixture of alkali metal salts of petroleum sulphonic acids which is soluble in 20° Baumé brine, insoluble in 24–25° Baumé brine, substantially free from benzol-soluble materials, soluble in methanol, ethanol, glycerine and acetone, which lathers freely in hard waters, sea water and brine without precipitating therefrom insoluble calcium or magnesium sulphonates.

16. A light-colored friable mixture of solid alkali metal salts of petroleum sulphonic acids, capable of use as a fabric detergent without leaving residual color or odor on fabrics, which is soluble in 20° Baumé brine but insoluble in 24–25° Baumé brine, substantially free from benzol-soluble materials, soluble in ethanol, methanol, glycerine and acetone, partially soluble in kerosene and carbon tetrachloride, and which lathers freely in hard waters, sea water and brine without precipitating therefrom calcium or magnesium sulphonates.

EDWARD FIELD.

CERTIFICATE OF CORRECTION

Patent No. 2,036,469.    April 7, 1936.

EDWARD FIELD.

It is hereby certified that error appears in the printed specification of the above numbered patent requiring correction as follows: Page 2, second column, line 60, after the word "used" insert a semi-colon; and that the said Letters Patent should be read with this correction therein that the same may conform to the record of the case in the Patent Office.

Signed and sealed this 9th day of June, A. D. 1936.

Leslie Frazer (Seal)    Acting Commissioner of Patents.